(12) United States Patent
Whitworth et al.

(10) Patent No.: US 6,431,793 B1
(45) Date of Patent: Aug. 13, 2002

(54) CONTAINMENT SYSTEM FOR SPILLS

(75) Inventors: Thomas M. Whitworth; David W. Love; Jane C. Love, all of Socorro, NM (US)

(73) Assignee: New Mexico Tech Research Foundation, Socorro, NM (US)

( * ) Notice: Subject to any disclaimer, the term of this patent is extended or adjusted under 35 U.S.C. 154(b) by 0 days.

(21) Appl. No.: 09/545,861

(22) Filed: Mar. 31, 2000

Related U.S. Application Data

(63) Continuation-in-part of application No. 09/283,674, filed on Apr. 1, 1999, now Pat. No. 6,238,137.

(51) Int. Cl.$^7$ .............................................. E02D 31/04
(52) U.S. Cl. ......................... 405/129.55; 405/129.57; 405/129.7; 405/38; 405/53
(58) Field of Search .................... 405/36, 38, 52–54, 405/129.75, 129.55, 129.57, 129.6, 129.7, 270

(56) References Cited

U.S. PATENT DOCUMENTS

| | | | | |
|---|---|---|---|---|
| 4,643,612 A | * | 2/1987 | Bergeron ..................... | 405/60 |
| 4,682,911 A | * | 7/1987 | Moreland ................... | 588/259 |
| 4,787,772 A | * | 11/1988 | Wagner ....................... | 405/53 |
| 4,934,866 A | * | 6/1990 | Gage ............................ | 405/54 |
| 4,968,179 A | * | 11/1990 | Frahm .......................... | 405/53 |
| 5,257,652 A | * | 11/1993 | Lawrence .................... | 141/86 |
| 5,263,794 A | * | 11/1993 | Webb ........................... | 405/52 |
| 5,421,671 A | * | 6/1995 | Lewis ........................... | 405/52 |
| 5,562,586 A | * | 10/1996 | Hyde-Smith ................ | 588/250 |
| 6,116,817 A | * | 9/2000 | Osborne ................... | 405/154.1 |
| 6,238,137 B1 | * | 5/2001 | Whitworth et al. .......... | 405/38 |

\* cited by examiner

*Primary Examiner*—Heather Shackelford
*Assistant Examiner*—John Kreck
(74) *Attorney, Agent, or Firm*—R W Becker & Associates; R W Becker

(57) ABSTRACT

A spill containment system for storage tanks, flow devices, and the like, and a containment system for spilled light non-aqueous phase liquid are provided. The spill containment system comprises a liner for receiving and containing liquid that spills, as well as a withdrawal tube that sealingly extends into the liner at a high point thereof. An alternative spill containment system comprises two liner portions, one about a storage tank and another about a flow device leading, for example, to a furnace. A withdrawal tube extends to a low point of the first liner portion. The containment system comprises a trench, filled for example with low capillarity medium, for at least partially surrounding an area where light non-aqueous phase liquid is stored or may migrate to. A liner is disposed over the top of the trench and along at least a portion of one side thereof. At least one withdrawal tube sealingly extends through the liner at a high point thereof and into the trench.

9 Claims, 7 Drawing Sheets

CONTAINMENT SYSTEM FOR SPILLS

RELATED APPLICATIONS

This is a continuation in part application of U.S. patent application Ser. No. 09/283,674 filed Apr. 1, 1999 now U.S. Pat. No. 6,238,137.

BACKGROUND OF THE INVENTION

The present invention relates to spill containment systems for storage or flow means, such as for at least one storage tank, for light and/or dense non-aqueous phase liquid, as well as to a containment system for spilled light non-aqueous phase liquid.

Leaking storage tanks that contain light non-aqueous phase liquids (LNAPLs), such as gasoline, diesel or jet fuel, heating oil, etc. have been and remain an expensive and ubiquitous environmental problem. Free-phase LNAPL is very difficult and expensive to remove from contaminated aquifers. In fact, a recent realization in the environmental industry is that removal of all of an aquifer's contaminants may not be possible or, at least, may not be practical from a stand point of limited economic resources. One gallon of free-phase LNAPL can contaminate almost 1 million gallons of ground water. Therefore, containment of free-phase LNAPL is of major importance in preventing the risk of significant environmental degradation due to LNAPL spills. A secondary trapping system for free-phase LNAPLs installed around underground storage tanks and beneath surface tanks and around tank farms would essentially prevent off-site contamination by free-phase LNAPLs.

The state of California currently requires liners and French drains below underground storage tanks to contain spills. However, such a design suffers from a fatal flaw when used with light non-aqueous phase liquids, which are less dense than water, because when the liner overflows during heavy rain storms or floods, or due to water system leaks, the spilled gasoline, etc. will simply float out of the liner and enter and contaminate the surrounding aquifer or soil.

U.S. Pat. No. 5,421,671, Lewis, discloses a containment system that requires several monitoring wells as well as horizontal or sub-horizontal drains. Unfortunately, the Lewis system cannot trap and remove free-phase LNAPL without having to pump water from the system as well. The Lewis system is also unable to handle situations when the containment structure is flooded or otherwise washed down with water. U.S. Pat. No. 5,575,585, Kovarak, discloses an apparatus for remediating already spilled contaminants. This apparatus, which uses several angled wells drilled out of the base of a pit and into contaminated ground water, is designed to clean up previously spilled contaminants and not for containing spills from storage tanks. This patent does not provide any LNAPL traps. U.S. Pat. No. 4,543,013, Wagner et al, discloses a system placed below surface water impoundments such as open pits or lagoons to treat contaminated water leaking from the overlying pit. The treated leakage is then collected and removed. This system is not designed for collection and removal of floating LNAPLs. U.S. Pat. No. 3,516,568, Fish, discloses a system for storing liquids using a flexible walled tank suspended in liquid. Again, no provision is made for the collection and removal of LNAPLs.

It is an object of the present invention to provide an economical and effective system for catchment or containment of surface and sub surface spills of light non-aqueous phase liquids from tanks or the like.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
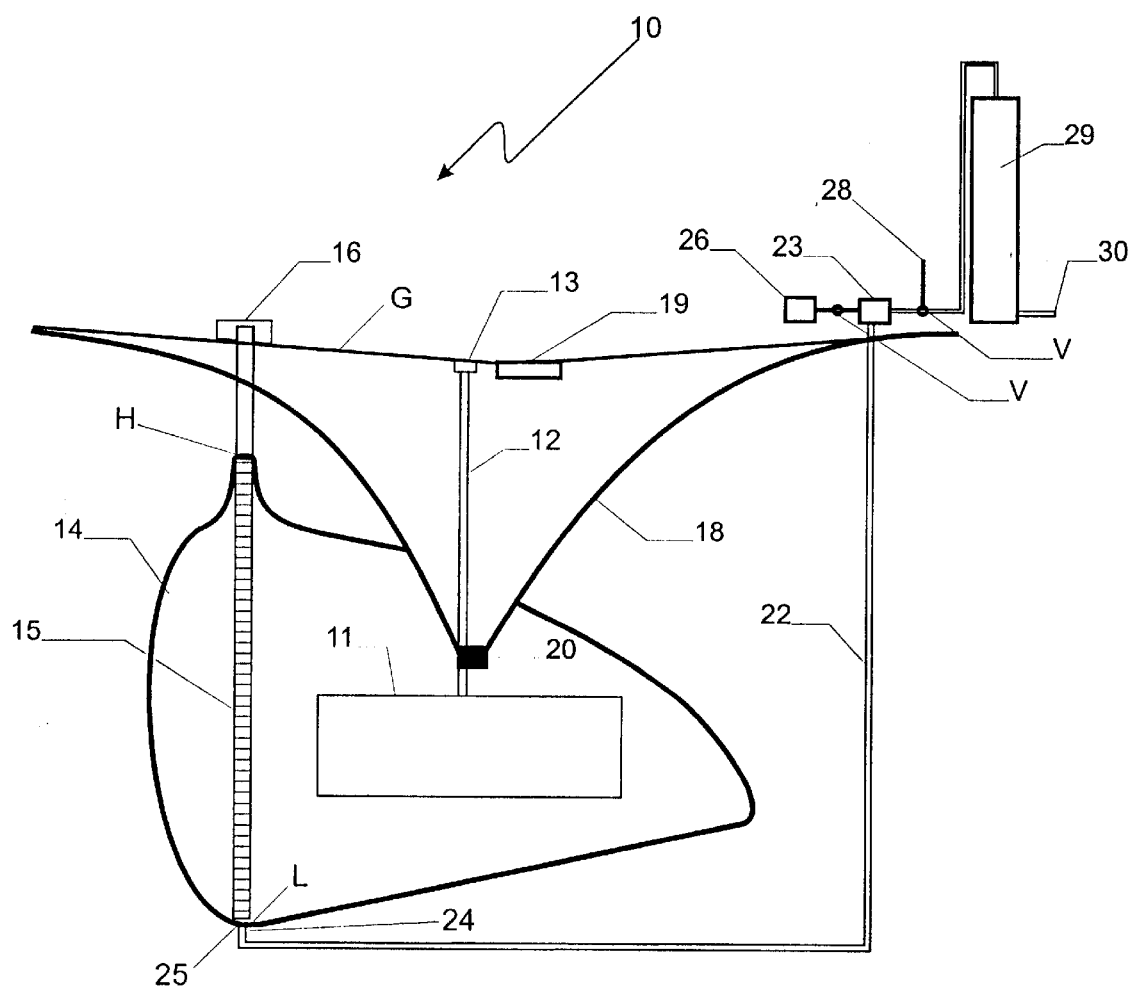
FIG. 1 illustrates a first exemplary embodiment of the inventive spill containment system.

The spill containment system of the present invention is provided for storage or flow means, such as for at least one storage tank and/or the associated pipes or hoses, etc., for light and/or dense non-aqueous phase liquid, and includes liner means for receiving and containing liquid that spills from the storage and/or flow means, as well as a withdrawal tube that sealingly extends into the liners means (i.e. is sealed relative thereto) at a high point or low point thereof, depending upon the system being used.

The storage or flow means as used in the context of the instant application refers to a variety of means or apparatus that serve for the storage and/or for the transport or flow of light and/or dense non-aqueous phase liquids. In addition to storage tanks, which can be both above ground and below ground tanks, the storage or flow means of the present invention are intended to cover such means as valves or pumping stations along pipelines or at industrial plants; the pipelines themselves; gas pumps at service stations or the like; fueling stations, such as used in conjunction with railroads, agricultural facilities, airports, or anywhere else where vehicles may be refueled, for example from fixed tanks, from tank trucks, or from long hoses leading to various storage facilities; oil field well heads; etc.

The spill containment system of the present invention prevents escape of spilled LNAPLs during flooding by surrounding the tank with an impermeable liner to thereby provide a secondary containment system for the liquid of a tank in the event that it spills. The configuration of the liner means is such that if the liner contains no water, the spilled LNAPLs will flow downslope within the liner and will collect in a low point or trap, where they can be pumped out of the system by a withdrawal tube or a monitoring well. If the system contains water, the spilled LNAPLs will float on the water, where they can be produced or withdrawn via the withdrawal tube. The LNAPLs can be forced to migrate upslope along the inner surface of the upper portion of the liner means to an inverted hollow or trap by adding water to the liner system. This is an important feature that allows recovery of essentially pure LNAPLs in volumes as small as one gallon from a system that might contain hundreds or even thousands of gallons of fluid. The space around the underground tank should be filled with clean pea-sized gravel or larger (either the space is hollow or filled with coarse porous material) to minimize the capillary rise of water into the LNAPL so that the trap will fill with mobile LNAPL at greater than residual saturation. The non-aqueous liquids can then be pumped easily out of the liner system. A screened withdrawal tube having inflatable packers can be used to selectively withdraw the non-aqueous phase liquid that is disposed over the water. The withdrawal or monitoring well also provides a single-point monitoring system to detect spills. This is an advantage over multiple well designs that are usually drilled after the fact at contaminated sites.

An optional additional upper liner or apron, which has a funnel shape below the surface of the site, can be used to funnel surface spills into the closed liner means that is disposed around the underground tank. This is a very important additional feature that can prevent environmental degradation due to surface LNAPL spills. The connection between the upper funnel-shaped structure and the lower enclosed liner means can be controlled with a valve so that floods and rain storms will not fill the enclosed liner means with water if this is not desired, and/or can keep the system from overflowing when it fills. A valve-controlled drain can be provided at the low point of the lower liner means portion, so that the liner means can be drained of LNAPL if the liner means contains no water, or to drain water from the liner means (a commercially available hydrophilic filter can be used on the drain if desired to help prevent LNAPLs from entering), or to add water to the liner means when it is desired to float any LNAPL remaining on water so that it can enter the upper trap where it can be removed from the liner means.

The inventive spill containment system can also be used in the ground below surface tanks or other potential spill sites, where the unsaturated zone, which is normally dry soil, is sufficiently thick so that the top of the highest seasonal water table is located below the base of the liner means. In this design, any spilled LNAPL flows downward through a sand or gravel layer and is funneled by an upper liner into a lower liner. If the water table rises, for example as might occur during a flood, an unusually heavy rainfall, or a water system leak, the LNAPL floats on the water and is trapped or prevented from escaping the site by the upper liner. When the water table then falls, the retained water level is above the lowest edge of the inlet so that the LNAPL must remained trapped. A valve-controlled drain at the low point in the lower portion of the lower liner, as well as a pump, can be provided to either drain the liner system of LNAPL when the liner system contains no water, or of water when desired (again a commercially available hydrophilic filter can be provided). Furthermore, the inlets are provided with valves; such inlets or ports can be used to add water to the liner system when it is desired to float any LNAPL remaining on the water table into the trap so that it can be pumped from the system. Such entry port or ports can be either continuous around the perimeter of the upper liner or can comprise individual valved ports that are fed by lined funnels.

Although the foregoing discussion has been directed to LNAPL, as mentioned previously the spill containment system of the present invention can also be used for DNAPLs, in other words, non-aqueous phase liquids that are more dense than water and will therefore sink to the bottom. Examples of such DNAPLS include chlorinated solvents, creosote, some pesticides, etc. The apron will catch and transmit DNAPL spills to the liner means as easily as LNAPLs. Thus, once the inventive spill containment has been installed, a storage tank or the like can be used for either LNAPLs or DNAPLs with no change to the system. For DNAPLs, remediation of the space within the containment system would involve flushing from the top; this could be done through the upper port/withdrawal tube or well, with removal of the DNAPLs being effected through a lower line/sump from the base of the liner means.

Portable models of the inventive containment system can also be used, for example at construction sites or military field refueling stations. Such versions could probably be smaller than containment systems at fixed sites, and would also not have to be buried as deeply; such portable models could be removed and reused after construction or field operations are completed.

Also conceivable are floating models that could be used where ships and boats are being refueled. Such floating versions could contain porous media in the form of lightweight plastic balls of appropriate size and material in order to reduce the weight of the system. Inflatable or non-inflatable pontoons or other flotation means could be used to float the spill containment system.

The inventive spill containment system could also be installed under offshore oil rigs (for example on platforms, drill ships, semi-submersible rigs, barges, and other types of rigs). The containment system would be used to catch spills of NAPLs and other chemicals on the rig and would thus prevent contamination of the surrounding water. With this version of the inventive spill containment system, plastic balls of proper size and material could be used instead of gravel in order to save weight.

The containment system of the present invention for spilled light non-aqueous phase liquids includes a trench means for at least partially surrounding an area where light non-aqueous phase liquid is stored or may migrate to, a liner that is disposed over a top of the trench means and along at least a portion of one side thereof, and at least one withdrawal tube that sealingly extends through the liner at a high point thereof and into the trench means.

This design of the present invention can be used around or adjacent to existing tank farms or other installations to trap escaped free-phase LNAPL before it leaves the site. The system consists of a trench dug from the surface into the aquifer below the lowest seasonal water table. The trench is then back filled with washed gravel or some other similar porous medium, or could be just empty space if a system is provided to support the overlying liner; the liner is then placed over the top of the trench to form a downwardly concave LNAPL trap. Monitoring wells or withdrawal tubes can be placed at the highest point in the trap or traps, which should be constructed so that they slope upward toward the withdrawal tubes. Thus, when spilled free-phase LNAPL migrates toward the edge of the site, it will float upward into the trap and be immobilized for future removal. This design of the inventive containment system could also be used to contain and remediate known free-phase LNAPL plumes. In many instances, a V-shaped or arc-shaped trench and trap system could be placed to intercept the plume.

Further specific features of the present invention will be described in detail subsequently.

Description of Preferred Embodiments

Referring now to the drawings in detail, the illustrated exemplary containment system 10 of FIG. 1, in this case a spill containment system, is provided for an underground storage tank 11; although only one such tank is shown in the drawing for ease of illustration, one or more of such underground storage tanks 11 can be protected by either a single or multiple inventive spill containment systems 10. As previously discussed, the tank or tanks 11 could also be other storage or flow means. A fill tube 12, which could also be an access port or the like, leads from the storage tank 11 to the surface, where a fill and/or entry point 13 is provided. An impermeable liner 14 surrounds the storage tank 11. The liner 14 may be flexible or rigid, and can comprise one or more layers. The liner can be made of polymeric material or even a material such as concrete, which could then have sprayed or otherwise applied thereon polymeric material that is impermeable to NAPLs. It is the shape of the volume contained by the liner 14 that is critical, and this shape will be discussed subsequently. If the liner 14 is flexible, it can be made of materials known as geomembranes, geosynthetics or possibly even geofabrics. However, the liners preferably form impermeable barriers and are therefore made of plastic such as high density polyethylene (HDPE) or very flexible polyethylene (VFPE). Other materials that could be used for the liners include polyester elastomer coated fabric, EIA coated fabric, tri-polymer blend coated fabric, polyurethane coated fabric, a polysulfide spray-on coating, thermoplastic sheets, fiberglass (e.g., using vinyl ester), and geosynthetic/clay liners, which comprise bentonite or other clay sandwiched between synthetic geomembrane or geotextile materials. Common thicknesses for such plastics are between 20 and 100 mil (0.02 to 0.1 inches). Specially compounded polymers can also be used for the liner material. The material for the liner 14 can thus be adapted to the particular non-aqueous phase liquid involved, with the material providing a combination of good chemical resistance, high tensile strength, high environmental stress crack resistance, low permeability, and high puncture resistance. In addition to the aforementioned materials, polyvinyl chloride (PVC) can also be utilized for certain liquids. One particular material that has good applicability with fuels such as gasoline and diesel is known as TYGON®.

As indicated previously, the liner 14 can comprise one or more layers, in which case such layers are generally bonded together. In addition, the layers could be made either of the same or of different materials.

Rather than thinner, more flexible layers, a wall-type construction could also be utilized. In contrast to the generally bonded-together layers discussed above, if a multiple wall configuration is utilized, the walls would not be bonded together, although they could abut one another. The multiple walls could also be spaced from one another, preferably with occasional spacers being provided that themselves could be bonded to the respective walls.

It should also be noted that the liner 14 could be embodied as the second wall of a double wall tank design. In such a case, the second, outer wall would have the same features as does the liner 14, namely an upper and a lower trap, with the inner surface of the upper outer containment wall sloping upwardly toward the upper trap, and with the inner surface of the lower portion of the containment wall sloping downwardly toward the lower trap. In addition, one or more withdrawal tubes would again be provided for allowing withdrawal of liquid from the upper trap and preferably also from the lower trap.

The volume or space confined within the liner 14 and surrounding the tank 11 is filled with gravel or other porous medium; pea gravel or larger is the preferred size of material. In the illustrated embodiment, the liner 14 slopes downward to a single low point L, and slopes upward toward a single high point H. Both the high point and the low point can be cone-shaped. At the high point, which can be disposed essentially over the low point, a withdrawal tube 15 extends through and is sealed with the liner 14. It should be noted that although the tube 15 has been called a withdrawal tube, it can also be used as a monitoring tube or for pumping material into the space contained by the liner 14, as will be discussed in detail subsequently. The withdrawal tube 15 is screened, slotted, perforated or otherwise open via appropriate aperture means to the space contained by the liner 14 over at least part of the interval of the tube that is contained within the liner space, starting at the high point H. When not in use, the withdrawal tube 15 is capped, as indicated by the reference number 16. The withdrawal tube 15 extends at least close to the base or low point L of the liner 14, and as indicated previously is sealed to the liner where it extends through the high point H thereof so that there will be no leaks at this location. If desired, for example for multiple tank installations, more than one high point and/or low point can be provided; at each high point an appropriate withdrawal tube 15 is provided.

Although only a single, straight withdrawal tube or pipe 15 is illustrated in the drawings, other configurations are also possible. For example, the withdrawal tube 15 could have a non-linear path to the lower trap, either being molded into the liner 14 (or the subsequently to be described apron 18 or upper liner 32), or could follow the contour of the tank, either being disposed adjacent to the tank or at a distance therefrom. In addition, instead of only a single withdrawal tube 15 being provided, two or more tubes or lines could be provided. For example,:one line could extend all the way to the lower trap, while another, separate line is provided only for the upper trap and does not extend there beyond.

An optional surface spill collection apron 18 can also be connected to the liner 14. This apron 18, which is similarly made of impermeable material, extends below the upper surface of the liner 14 and is sealed to the liner so that there will be no leaks where the apron 18 and liner 14 join one another. The area above the apron 18 is filled with porous material; pea gravel and larger again being the preferred size. The ground surface, indicated by the reference symbol G, is preferably sloped slightly down toward the center of the collection apron; if a concrete pad is present, one or more drains 19 should be installed so that spills can drain from the pad into the apron, from where they flow under the influence of gravity into the containment structure formed by the liner 14. A valve 20 can be installed at the low point of the funnel-shaped apron 18 to control the communication between the collection apron and the space enclosed by the liner 14. The valve 20 can also be used to prevent overflow of the lower containment system. Such a valve can be an automatic valve, a check valve, or even a manual valve. In wet regions, the spill containment area can be roofed to decrease the volume of unwanted water that enters the containment system.

Rather than being connected to a liner that surrounds one or more tanks, the surface spill collection apron 18 could alternatively lead to a separate liner that is provided merely for collecting spills from the apron. Such a separate liner would have the same collection features, i.e., the upper and lower traps and the withdrawal tube, that were previously described in conjunction with the liner 14.

It should be noted that the gravel or other porous material that is disposed above the spill catchment apron 18 can be washed clean of LNAPL adhering to the grains of gravel by surfactant (soap) flooding, or by steam or hot water flooding. The LNAPL that is released will then move into the containment system where it is dealt with in the manner previously described. Such a wash procedure can be carried out periodically either after spills or on a scheduled basis as desired.

The inventive system is designed to provide for self-remediation. The line 22 is connected to a pump 23 and leads to the low point L in the system; the line 22 can be used to either remove fluids from the containment structure or to introduce fluids thereto. The line 22 can be located outside of the containment structure, with the end 24 of the line piercing and being sealed to the lower portion of the impermeable liner 14. Alternatively, the line 22 can be located within the containment system such that it pierces and is sealed to the upper portion of the liner 14. The important thing is that the inlet/outlet port or drain 25 of the line 22 be located at the low point L of the lower portion of the containment structure or liner 14. It should also be noted that in the absence of the optional line 22, the withdrawal tube 15 would extend to the low point L and would be open at that location.

Remediation of spills can be accomplished more efficiently by first removing the free-phase or floating gasoline or other light non-aqueous phase liquids (LNAPLS) from the containment system 10. This minimizes the amount of LNAPLs in the withdrawn water that must be either treated or disposed of at a hazardous waste facility. Selective LNAPL recovery can be done in one of three ways:

1. A pipe having a screened or otherwise open section that is shorter than the screened interval or section of the withdrawal tube 15 can be inserted into the withdrawal tube, with packers being used to seal the inserted pipe at the desired level, whereupon free-phase LNAPL can be selectively pumped from the withdrawal tube 15. Alternatively, other recovery methods, such as oil skimmers, could also be used. However, when the floating LNAPL is spread over the entire width of the containment structure, either of these approaches will inevitably begin to withdraw significant quantities of water as the thickness of the free-phase LNAPL layer diminishes.

2. At present, the best approach to maximize the amount of free-phase LNAPL that can be recovered appears to be to flood the containment structure with water either through the withdrawal tube 15 or through the line 22 from an inlet port 26. The water that is input into the containment structure can contain surfactants, which reduce the surface tension of the LNAPL and allow it to move through the pores of the gravel more easily; hot water with or without surfactants could also be utilized to the same effect. Thus, remediation can be integral with LNAPL removal. After the water has been introduced into the containment structure, the free-phase LNAPL floats to the trap at the high point H in the lower containment structure 14, where it is confined in an increasingly smaller area, thus maximizing the thickness of the floating free-phase LNAPL and allowing significantly more of this free-phase product to the recovered from the withdrawal tube 15. This is a very significant economic advantage and conservation measure for relatively large facilities where thousands or tens of thousands of gallons of LNAPL are stored. The cone or funnel shape of the apron-containment structure 18, where it extends into and below the upper portion of the liner 14, allows LNAPL to flow around this part and to the high point H of the liner 14 without being trapped or detained at the juncture between the apron 18 and the liner 14.

3. A final method is to use the lower drain 25 of the line 22, or the bottom of the withdrawal tube 15, to remove any free-phase product. This method is used when the containment system contains little or no water. Thus, it can be seen that the present invention allows for maximum free-phase LNAPL recovery under either wet or dry conditions.

Any LNAPL that remains in the containment system, for example stuck to or between grains, etc, can either be bioremediated in place or can be flushed from the system using surfactant or other flooding methods. To bioremediate any remaining LNAPL, the system can be flooded with microbial nutrients via the withdrawal tube 15 or through the lower port 25 of the line 22 via the inlet port 26 thereof. If surfactant or other flooding is provided, the released LNAPLs could then be recovered either via the withdrawal tube 15 or via the line 22.

Any water containing small amounts of dissolved LNAPL could be removed off site for treatment via, for example, the withdrawal means 28, or could be pumped to an optional on-site conventional air stripping or other treatment system 29, and could then be released via the outlet 30. Appropriate valves V can be provided to control flow. Air stripping systems are perhaps the most economical remediation method for volatile organic compounds. Such systems are economical and easy to construct, comprising only a pipe, a pump, an air blower, and a porous substrate. Although the treatment system 29 has been shown as being connected to the line 22, it would, of course, be also possible to connect such a system to the withdrawal tube 15 at the location 16 thereof.

The containment system 10 is also designed to handle flooding conditions. This is extremely important since many underground storage facilities are located in flood-prone areas, such as river valleys. The valve 20 at the bottom of the collection apron 18, which is preferably an automatic check valve, prevents the loss of spilled free-phase LNAPLs during flooding conditions, heavy downpours, as a result of water-line breakage, etc. This is a very important means for preventing LNAPL contamination that commonly occurs from service stations and underground storage facilities during flooding conditions.

Optional features that can be used with the containment system 10 include anchors to keep the tank or tanks, and or the containment structure, in place under the force of upward-rising groundwater. Such anchors could be conventional buried dead man anchors, or could include extension flaps of liner material that are fastened to the containment structure and are perforated to allow rising groundwater to pass through them. Remote sensors and alarms could also be provided. Computer-driven remote-controlled automatic remediation systems could be provided. Such a system could routinely detect and remediate surface spills without human intervention. Tank entry ports that are large enough for personnel to enter the tanks could be provided in this system.

Although the embodiment illustrated in FIG. 1 provides a spill containment system comprising a liner that surrounds an underground storage tank, according to the teachings of this invention other configurations are also possible. For example, reference is now made to FIGS. 2–7, wherein other containment system configurations are shown and are generally indicated by the reference numerals 10A–10E, wherein parts thereof that are similar to the containment system 10 of FIG. 1 are indicated by like reference numerals that where appropriate are followed by the reference letter A, B, C, D or E.

Figure 2:
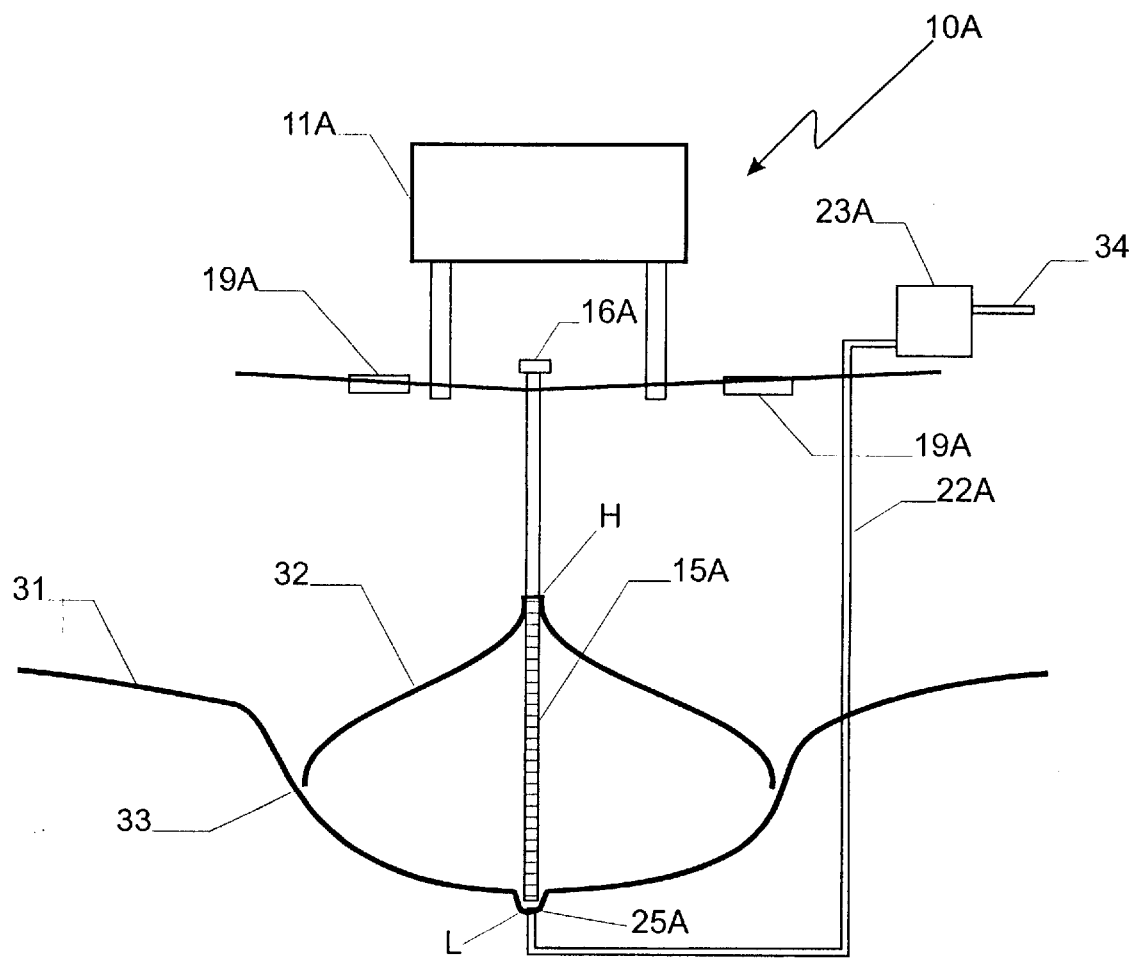
FIG. 2 shows a second exemplary embodiment of the inventive spill containment system.

The containment system 10A illustrated in FIG. 2 shows another embodiment for containing LNAPL spill. In the embodiment illustrated, the containment system 10A is utilized beneath a surface storage tank 11A, although an underground storage tank could also be placed in this embodiment of the inventive containment system; one or more storage tanks 11A could be provided.

In the embodiment of the spill containment system 10A a lower liner 31 forms a spill catchment apron that forms the bottom portion of the containment system. The lower liner 31 can either be separate from or joined to the upper liner 32 to form the containment system 10A. If the upper liner 32 is not connected to the lower liner 31, and a small gap is left around the perimeter 33 of the upper liner, the system functions as a spill containment system that can trap LNAPL during time of flooding and prevent a release of free-phase LNAPL to the environment. LNAPL is trapped during floods because it floats on the water in the containment structure. As the flood waters enter the containment structure, the LNAPL is forced to rise into the upper portion of the containment structure where it is trapped. The air above the liquid is compressible enough to allow this to occur without difficulty. In this embodiment, all remediation must be done as indicated in situations 1 and 3. described in conjunction with the containment system 10 of FIG. 1.

If the upper liner 32 and lower liner 31 are joined and sealed together, with the exception of one or more funnel-shaped ports along the rim 33, which must slope towards the port or ports, and a valve is installed in such ports, then the system functions the same as the containment system 10 of FIG. 1, and has all three of the remediation options.

In the embodiment of the spill containment system 10A illustrated in FIG. 2, the withdrawal tube 15A, which in other respects operates the same as does the withdrawal tube 15 of the containment system 10, sealingly extends through the upper liner 32 at the high point H, and extends at least nearly to the low point L of the lower liner 31. In this embodiment also, an optional line 22A can be connected to the lower liner 31 at the low point L, and can operate as does the line 22 of the embodiment of FIG. 1, along with all of the associated features, such as the pump 23A. The line 34 extending from the pump can lead, for example, to a treatment system similar to the treatment system 29 of the containment system 10.

Figure 3:
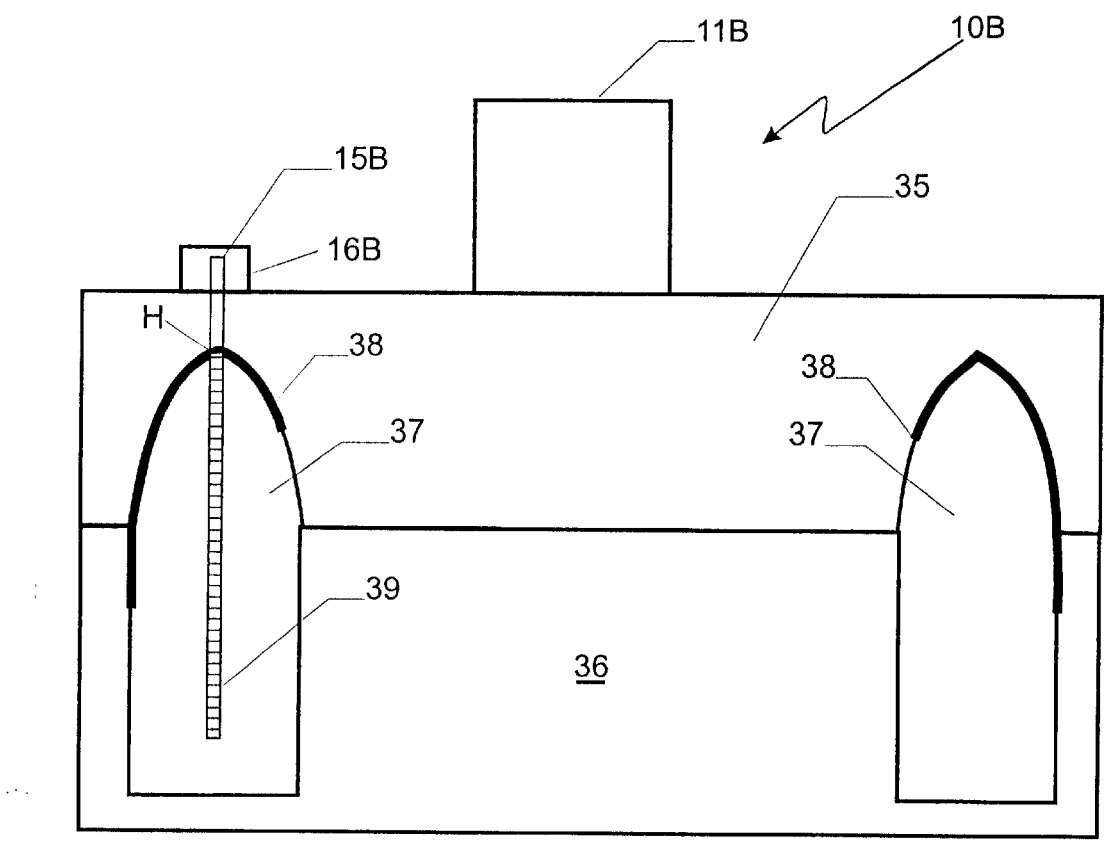
FIG. 3 shows an exemplary embodiment of an inventive containment system for spills.

The containment system 10B illustrated in FIG. 3 is a system that can be installed around the periphery of a storage tank facility where the storage tanks are either above ground or below ground; this embodiment can also be utilized for any other spill situation. One above-ground tank 11B is shown in FIG. 3, although a number of tanks can be provided.

The embodiment of the containment system 10B is designed especially for the situation where a relatively impermeable soil cap 35 is disposed over a shallow aquifer 36, especially a confined or a semi-confined aquifer. A trench 37, which can partially or entirely surround the tank storage facility, is dug into the aquifer 36 and is filled with gravel, especially clean, well sorted gravel of pea size or larger. The primary difference from known trenches that are used in plume-remediation is the presence of an impermeable liner 38 that is installed over the top of the gravel-filled trench 37 and extends at least partially down at least one side of the trench, namely at least the outer side thereof. Any free-phase LNAPL spills that reach the aquifer will migrate along the upper level of the water in the aquifer and, upon reaching the gravel-filled trench 37, will be trapped and will be unable to migrate farther.

When a free-phase LNAPL body is in contact with water in saturated porous media, a capillary fringe or zone of capillarity exists between them. Water will push into the free-phase LNAPL until the interfacial forces are balanced and it can no longer displace LNAPL. The height of capillary rise of water into free-phase LNAPL for a given pore and pore throat size can be calculated from Hobson's formula. Because the height of the zone of capillary rise of water in the LNAPL is greater for fine-grained material and because most aquifers contain finer-grained material than gravel, the impermeable liner 38 must extend downward below the surface of the aquifer for a distance equal to or greater than the capillary rise of water into the LNAPL for the aquifer material. The recommended depth for the impermeable liner 38 along the outside of the trench, i.e., the side farthest away from the tank or tanks, should take into account water table changes and depression of the water table by LNAPL accumulating in the trench trap 37.

One or more withdrawal tubes or wells 15B can extend through the liner 38 at the high point H thereof and into the trench trap 37. Such tubes 15B can be used to monitor for spills, to withdraw LNAPL, and to effect the remediation if necessary. The withdrawal tubes 15B can again be screened or otherwise provided with appropriate aperture means as indicated by the reference numeral 39.

Figure 4:
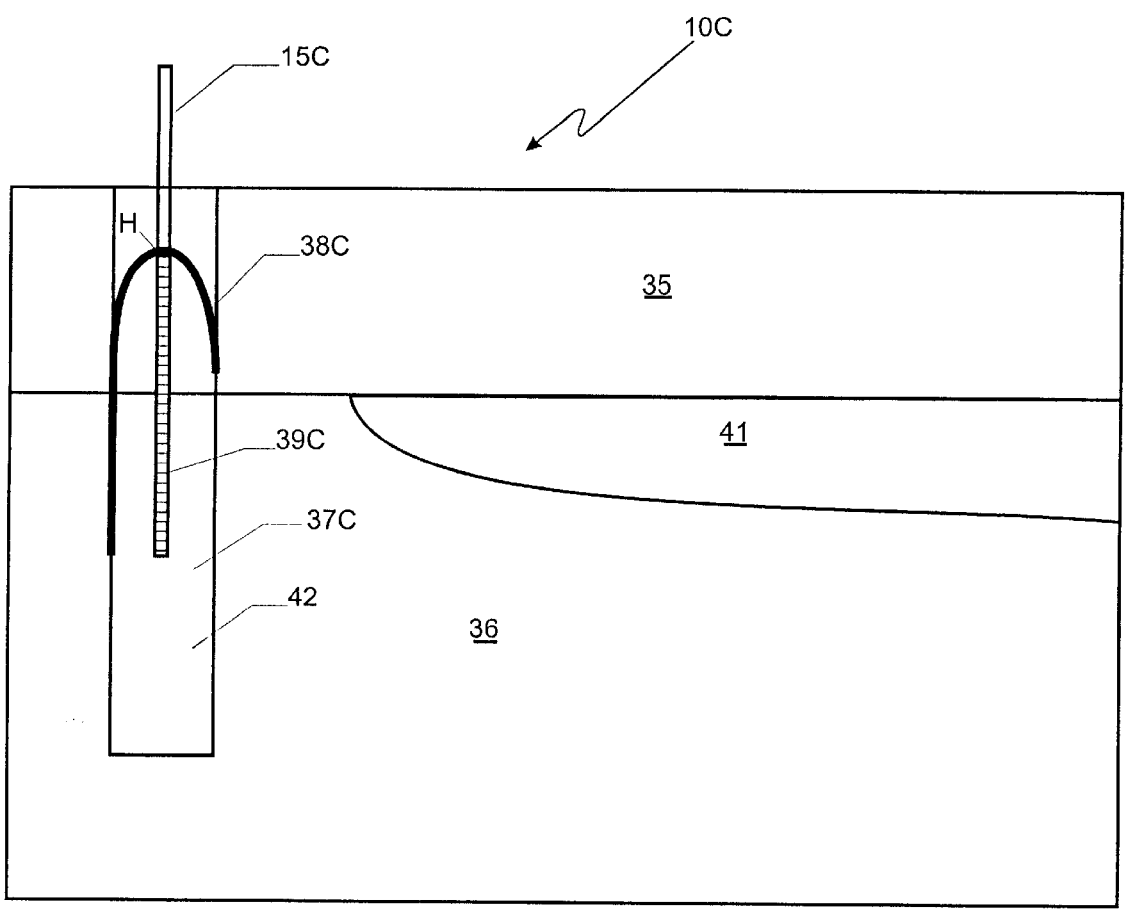
FIG. 4 shows a further exemplary embodiment of an inventive containment system for spills.
Figure 5:
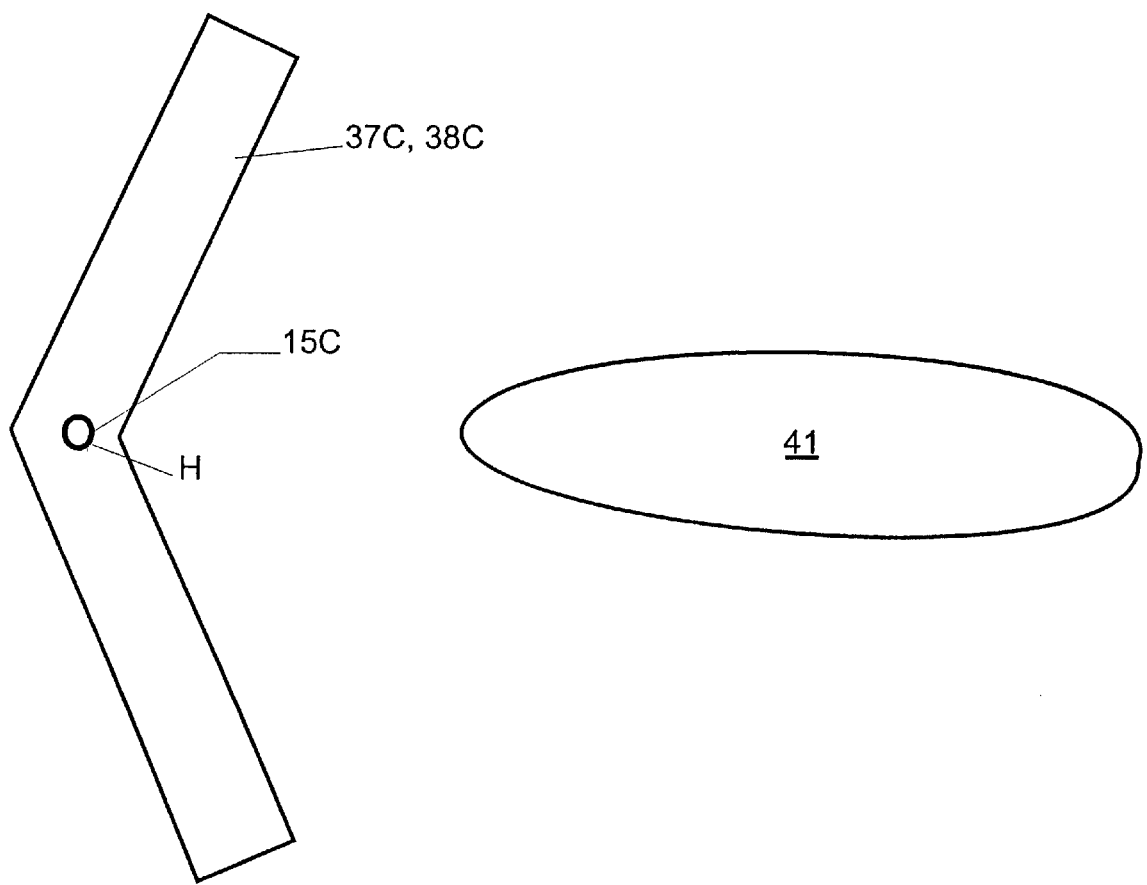
FIG. 5 illustrates one specific exemplary embodiment of the shape of the containment system of FIG. 4.

The embodiment of the containment system 10C illustrated in FIGS. 4 and 5 is for use after a spill has occurred and an advancing plume 41 of LNAPL is to be stopped. In particular, when a confining soil cap 35 exists at a site where the aquifer 36 is contaminated with free-phase or mobile LNAPL, the trench trap system comprising the withdrawal tube 15C, the liner 38C and the gravel 42 can be used to intercept the advancing LNAPL plume 41 and trap the free-phase LNAPL for subsequent removal and/or remediation. The trench 37C is dug so that it will intercept the migrating plume; the trench is backfilled with gravel 42. The impermeable liner 38C is installed over the top of the trench utilizing the criteria explained in conjunction with the embodiment of FIG. 3. One or more withdrawal or monitoring tubes or wells 15C having apertures 39C are installed. If the aquifer 36 is significantly confined, the top of the impermeable liner 38C should always be below the piezometric surface (the height water would rise to if a well were drilled at that point) of the aquifer and should slope upward to a single high point H, although more than one high point could be used if optimal. The LNAPL will then migrate upslope beneath the impermeable liner and will concentrate and be trapped at the high point or points H of the system. One well or tube 15C installed at a single high point H should be sufficient for monitoring, for removal of LNAPL, and/or for remediation of the free-phase LNAPL that will be trapped in the trench-trap system. FIG. 5 illustrates one specific exemplary embodiment of the shape of the containment system 10C of FIG. 4. In particular, FIG. 5 shows a free-phase LNAPL plume 41 migrating toward the trench-trap system, which in this embodiment is in the shape of a V; an arc or other shape that is open toward the plume would also be appropriate. A single withdrawal tube or well 15C is illustrated at the high point H of the impermeable liner 38C. It should be noted that more than one withdrawal tube could be used if desired.

Figure 6:
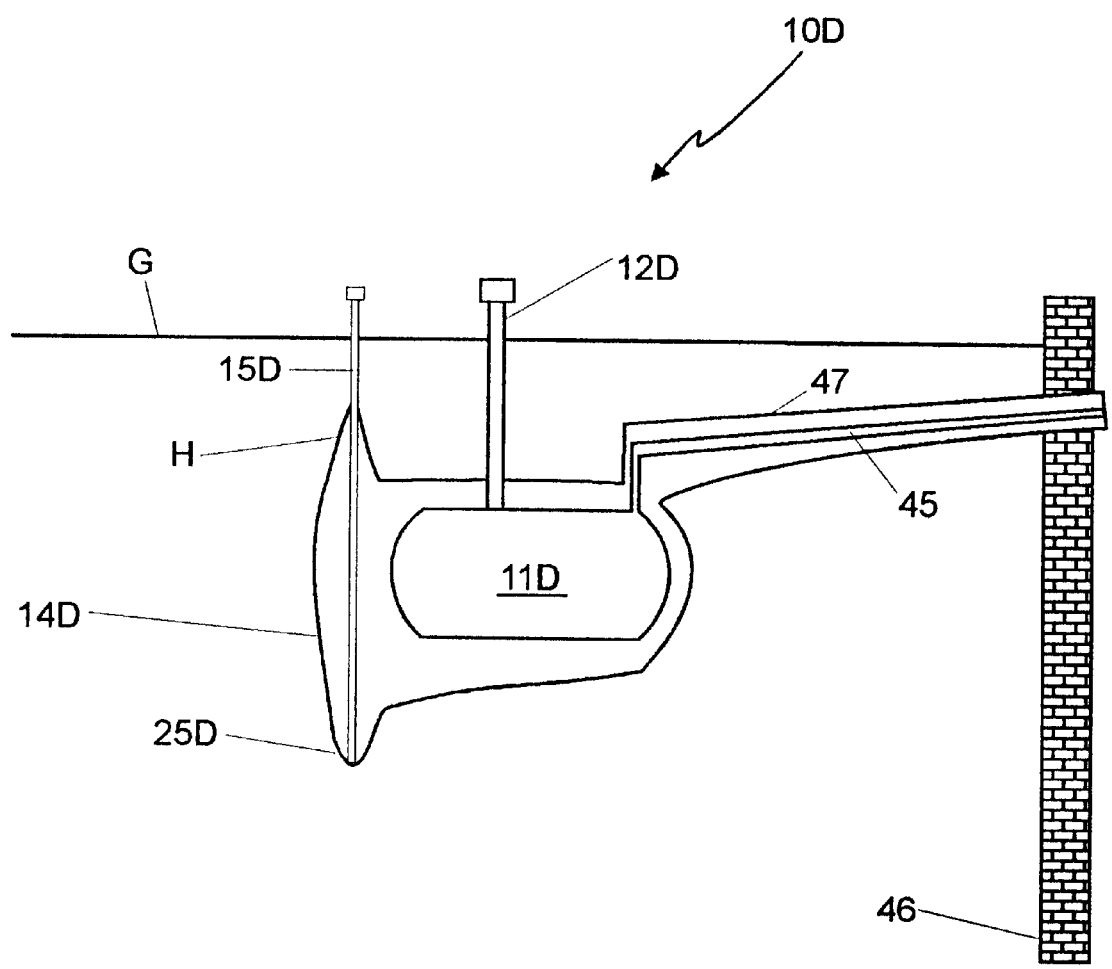
FIG. 6 illustrates a further exemplary embodiment of the inventive spill containment system.
Figure 7:
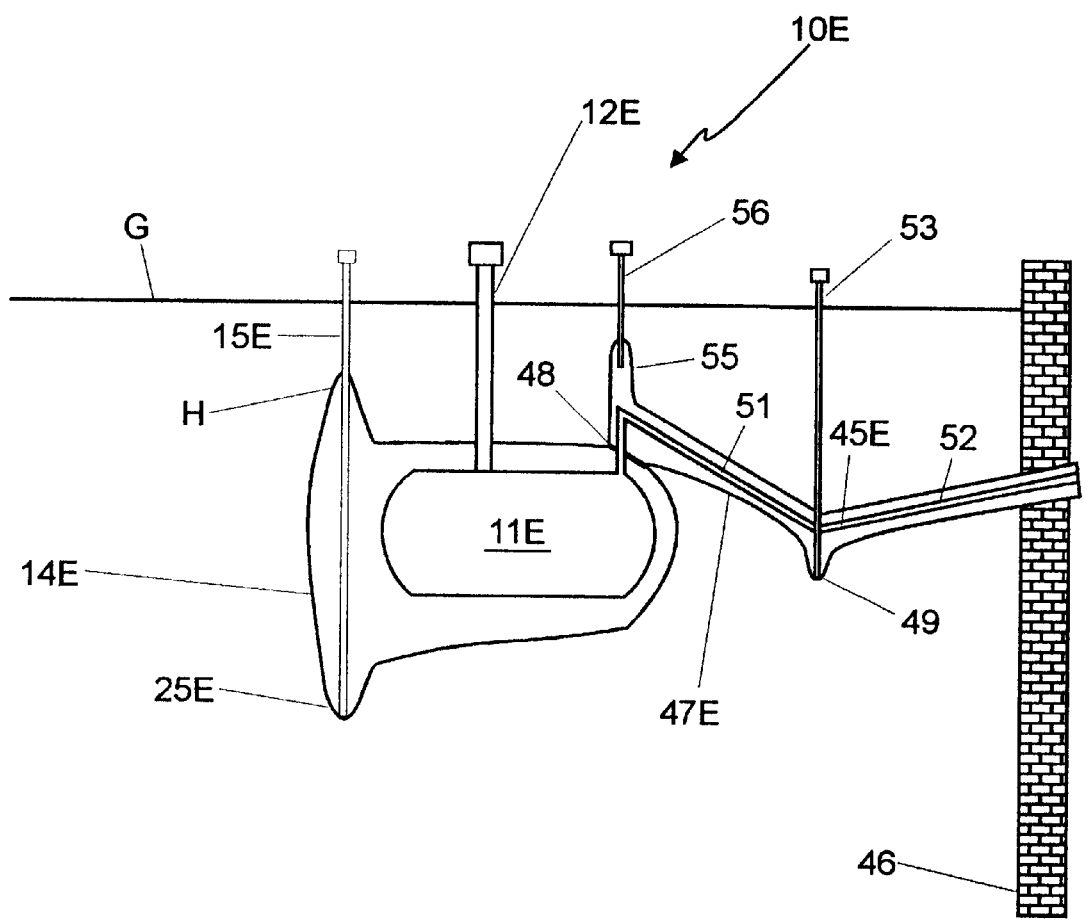
FIG. 7 illustrates a modification of the embodiment of FIG. 6.

The containment systems 10D and 10E illustrated in FIGS. 6 and 7 are intended for use with underground heating oil tanks, especially home heating oil tanks, where such tanks 11D and 11E are disposed near a building. A feed line or pipe 45 or 45E leads from the tank to a furnace or the like. In the illustrated embodiments the tanks are shown as being disposed underground outside of a building, with the pipes 45, 45E leading through a wall 46, such as a basement wall, into the building. It is to be understood that the tanks could also be disposed, for example, in the basement or other interior space if desired. It is also to be understood that although the pipes 45, 45E are shown as being connected to an upperside of the tanks 11D, 11E, they could be connected to any other portion of the tanks.

In the embodiments illustrated in FIGS. 6 and 7, the liner means of the containment systems 10D and 10E comprise a first liner portion 14D or 14E that essentially surrounds the tank 11D or 11E, as well as a second liner portion 47, 47E that surrounds the pipe 45, 45E and can, if desired, extend all the way to a furnace. It is to be understood that either of both liner portions can comprise multiple components that are then sealingly interconnected, such as along appropriate flanges or in any other suitable manner. The two liner portions can be in flow communication with one another, as shown in the embodiment of FIG. 6, or can be sealed from one another, as shown in the embodiment of FIG. 7. These alternative embodiments will now be described in detail.

In the embodiment of the spill containment system 10D of FIG. 6, the pipe 45 that leads to the furnace always slopes upwardly from the tank 11D. Therefore, by providing fluid communication between the second liner portion or jacket 47 and the first liner portion 14D, any liquid that leaks from the pipe 45, the tank 11D, or any of the associated fittings can flow downwardly to the sump or lower trap 25D that is provided in the liner portion 14D. The withdrawal tube 15D leads to this low point 25D that is the culmination of the downward slope of the liner portion 14D. The withdrawal tube 15D operates in the same manner as described in conjunction with the previous embodiments. An optional upper trap or high point H can also be provided in this embodiment. It should be noted that the first and second liner portions 14D, 47 can be a single component, or separate components that are then sealingly connected to one another.

The embodiment illustrated in FIG. 7 is for that situation where the pipe 45E passes through the basement wall 46 at a level that is lower than the top of the tank 11D or the first liner portion 14E. In this embodiment, a seal 48 is preferably provided between the first and second liner portions 14E, 45E. In addition, the pipe 45E extends in such a way that there is a single low point or sump 49 between the basement wall 46 and the tank 11E, although it is to be understood that if necessary more than one low point could be provided. In the illustrated embodiment, the low point 49 is provided where the two pipe sections 51, 52 of the pipe 45E adjoin one another. The second liner portion or jacket 47E surrounds the two pipe sections 51 and 52. In this embodiment, a second withdrawal tube 53 is provided for withdrawing liquid that collects at the low point 49. In addition, if an optional upper trap 55 is provided at the high point of the pipe system 45E, a further withdrawal tube 56 could be provided. Again, an optional upper trap H can be provided for the first liner portion 14E.

The embodiment illustrated in FIG. 7 could be modified so that rather than having the two pipe sections 51 and 52 that slope toward one another, a single pipe section 45E could be provided, with the jacket or second liner portion 47E that surrounds it having a low point 49 disposed, for example, closer to the basement wall 46.

As in previous embodiments, drain plugs could be provided in the low points 25D, 25E, 49, although such drain plugs would represent another component that has to be sealed. Again, the various withdrawal tubes can be straight or can bend around objects, such as the tanks. Appropriate fuel oil and/or water detectors or sensors can also be provided, if desired. Vapor vents could also be provided if necessary. Again, the various liner portions could be of single layer, multiple layer, single wall or multiple wall construction.

With regard to the embodiments illustrated in FIGS. 1 and 2, various piping that is utilized can be routed over the surface spill containment apron so that any spills resulting from the piping will be collected by the apron and will be prevented from contaminating soil or ground water. The piping can also be covered with an impermeable cover. Such a cover, which can be in the form of a containment channel, can either be bonded to the upperside of the apron, or can entirely contain the piping if the latter is to be disposed at a distance from the apron. The containment channel can either be filled with coarse, porous medium or can be left empty. Any convenient cross-sectional shape can be provided for the containment channel. To provide for flexibility, the containment channel need not be bonded to the apron along its entire length. The lower end of the cover or containment channel allows any spilled product to drain into the containment system, preferably by means of a one-way check valve that allows liquid to flow out of the containment channel and into the containment system, but not in the reverse direction.

The present invention is, of course, in no way restricted to the specific disclosure of the specification and drawings, but also encompasses any modifications within the scope of the appended claims.

We claim:

1. A spill containment system for storage and flow means for light or dense non-aqueous phase liquid, comprising:
   a first liner portion that substantially surrounds storage means, wherein said first liner portion is sloped to form a low point;
   a second liner portion that substantially surrounds flow means extending from said storage means, wherein said first and second liner portions contain liquid that spills from said storage or flow means; and
   a withdrawal tube that sealingly extends into said first liner portion to said low point thereof.

2. A spill containment system according to claim 1, wherein said second liner portion slopes downwardly toward said first liner portion, and wherein said second and first liner portions are in flow communication with one another.

3. A spill containment system according to claim 1, wherein said first liner portion is also provided with a high point, and wherein a withdrawal tube sealingly extends into said high point.

4. A spill containment system according to claim 3, wherein said withdrawal tube is provided with apertures along at least a portion of its length, starting at said high point.

5. A spill containment system according to claim 4, wherein said withdrawal tube extends at least nearly to said low point of said first liner means.

6. A spill containment system according to claim 4, wherein a drain is provided at said low point of said first liner means, and a line is connected to said drain for conveying fluid to or from said containment system.

7. A spill containment system for storage and flow means for light or dense non-aqueous phase liquid, compromising:
   a first liner portion that extends about storage means, wherein said first liner portion is sloped to form a low point;
   a second liner portion that extends about flow means extending from said storage means, wherein said first and second liner portions contain liquid that spills from said storage or flow means, and wherein said second liner portion is sloped to form a low point; and
   a withdrawal tube that sealingly extends into said first liner portion to said low point thereof, wherein a further withdrawal tube sealingly extends into said second liner portion to said low point thereof.

8. A spill containment system according to claim 7, wherein said first and second liner portions are sealed from one another.

9. A spill containment system according to claim 8, wherein said first and second liner portions are provided with respective high points, and wherein withdrawal tubes extend into said high points.

* * * * *